United States Patent [19]
Hasegawa et al.

[11] Patent Number: 5,607,797
[45] Date of Patent: Mar. 4, 1997

[54] LEAD ACID STORAGE BATTERY AND METHOD FOR MANUFACTURE THEREOF

[75] Inventors: Toshirou Hasegawa, Toyohashi; Kazuhiko Shimoda, Kosai; Kunio Makino, Kosai; Mitsuo Tomioka, Kosai, all of Japan

[73] Assignee: Matsushita Electric Industrial Co., Ltd., Osaka, Japan

[21] Appl. No.: 441,129

[22] Filed: May 15, 1995

[30] Foreign Application Priority Data

| May 24, 1994 | [JP] | Japan | 6-109628 |
| May 24, 1994 | [JP] | Japan | 6-109665 |
| Aug. 2, 1994 | [JP] | Japan | 6-181257 |
| Apr. 14, 1995 | [JP] | Japan | 7-089290 |

[51] Int. Cl.$^6$ ................................. H01M 10/16
[52] U.S. Cl. ............. 429/208; 429/136; 429/161
[58] Field of Search .................... 429/161, 160, 429/159, 211, 208, 136; H01M 10/14

[56] References Cited

U.S. PATENT DOCUMENTS

| 3,514,331 | 5/1970 | Cupp et al. | 429/136 |
| 4,124,745 | 11/1978 | Knapp et al. | 429/161 X |

FOREIGN PATENT DOCUMENTS

58-119173  7/1983  Japan.

Primary Examiner—John S. Maples
Attorney, Agent, or Firm—Watson Cole Stevens Davis, P.L.L.C.

[57] ABSTRACT

The present invention relates to a lead acid storage battery and provides a lead acid storage battery having a high durability against complicated vibrations such as perpendicular and horizontal vibrations and the combination of these vibrations applied by vehicles or machines on which the battery is installed and having a long shelf life. A polyolefin resin having good fluidity is heat molten and poured into two portions above and near the left and right ends of the plate group comprising positive and negative plates having lugs at nearly the center portion so that the resin reaches at least one of the inner wall or inner partition wall, thereby to form a beam-shaped plate fixing member.

9 Claims, 7 Drawing Sheets

LEAD ACID STORAGE BATTERY AND METHOD FOR MANUFACTURE THEREOF

BACKGROUND OF THE INVENTION

The present invention relates to lead acid storage batteries. More specifically, the present invention is concerned with a lead acid storage battery excellent in vibration resistance of plate groups and a method for making the same.

PRIOR ART

As for lead acid storage batteries used in automobiles, although recently the vibration applied to the batteries while driving of automobiles has diminished with the increase in the paving rate of road, the mechanical strength of the strap for connecting plate groups decreases owing to corrosion caused by an increase of temperature or decrease in the amount of electrolyte resulting in breakage of the batteries. Furthermore, lead acid storage batteries used in agricultural machinery and construction machinery receive a great vibration applied by the machinery and are required to have a high mechanical strength of their constructive parts.

In order to meet the demand, it has been proposed to make a lead acid storage battery having vibration resistance by injecting and filling an adhesive comprising an epoxy resin in the form of a strip in one or two portions above the plate group contained in each of the cell chambers provided in the case to fix the plate group at the upper portion thereof, thereby inhibiting the shaking of the plate caused by vibration.

On the other hand, as materials for the case of lead acid storage batteries used in automobiles, there are generally used polypropylene resins which are light in weight and excellent in chemical resistance and small in raw material cost.

These polypropylene resins have no or very low adhesion to other resins unless they are subjected to any treatment and hardly adhere to the epoxy resins filled in the portion above the plate group to fix the plate group.

As a result, the epoxy resin filled in the portion above the plate group acts effectively to fix together the positive plate and the negative plate which constitute the plate group or fix integrally the plate group containing the positive and negative plates and envelope separators, but cannot be integrated with the inner wall of the cell chamber of the case containing the plate group. Therefore, when a strong vibration is applied to lead acid storage batteries so fabricated, positional deflection between the plates constituting the plate group can be prevented by the fixing action of the epoxy resin, but the plate group, which is heavy in weight, is apt to shake in the cell chamber of the case, causing concentration of a force on the strap connecting the lug of the plates of the same polarity or on the connector between the adjacent cells. Thus, breakage or degradation of these portions is brought about.

Accordingly, the substantial vibration resistance is still insufficient.

SUMMARY OF THE INVENTION

A principal object of the present invention is to solve the above problems and to provide lead acid storage batteries excellent in vibration resistance even under the condition of strong vibration.

Another object of the present invention is to provide a method for making lead acid storage batteries superior in workability and excellent in vibration resistance.

The lead acid storage batteries which attain the above objects have plate groups comprising a plurality of positive plates alternating with a plurality of negative plates and envelope separators between the plates, the envelope separators extending to a position higher than the upper end of the plates, each of the plates having a lug and the lugs of the plates of the same polarity being integrally connected by a connecting strap; a case comprising a thermoplastic synthetic resin in which a plurality of cell chambers containing the plate groups are formed by partitioning the inside of the case by inner partition walls; and a cover which covers an opening of the case, the upper end of the plate group contained in the cell chamber of the case being integrally fixed by a beam-shaped insulating synthetic resin provided above the plate group, at least one of left and right ends of the beam-shaped synthetic resin being fixed to the inner wall of the case or the partition walls by fusion bonding.

The thermoplastic synthetic resin which forms the case is suitably polypropylene because of its light weight, excellent chemical resistance and low raw material cost as mentioned above and the materials of the beam provided above the plate group are preferably polyolefins including polyethylene and polypropylene. The method for making the lead acid storage battery according to the present invention comprises forming a plate group by alternately arranging a plurality of positive plates, a plurality of negative plates and a plurality of envelope separators extending above the plates and integrally connecting lugs of the plates of the same polarity by a connecting strap, putting a plate group in each of a plurality of cell chambers produced in a case made of a thermoplastic synthetic resin by partitioning the inside of the case by inner partition walls, pouring an electrically insulating resin heated to molten state into the portion above the plate group so that the molten resin crosses the plate group in the direction of its thickness and both the left and right ends of the thus formed beam of molten resin contacts with the inner wall of the case or the inner partition wall and then curing the poured molten resin by cooling to form a beam-shaped plate fixing member. The heat molten resin is poured in the following manner. That is, two shape regulating plates having a length which is the same as or somewhat narrower than the width (in the depth direction) of the cell chamber of the case, namely, the interval between the inner partition walls, are inserted into the portion above the plate group in each cell chamber at a right angle to the arranging direction of the plates and the molten resin is poured into the space between the two shape regulating plates and is cured by cooling.

The two shape regulating plates serve as a guide which controls unlimited effluence of the poured molten resin and thereby forming a beam-shaped plate fixing member. Therefore, the interval between the two opposing plates determines the width of the plate fixing member. Furthermore, the molten resin poured into the space between the two regulating plates is preferably a polyolefin resin such as polyethylene, polypropylene or the like considering the fusion bonding to the thermoplastic synthetic resin such as polypropylene which forms the case. The poured molten resin contacts with the inner wall of the case or the inner partition wall to give heat to the wall portion to melt at least the surface of that portion and fusion bonds to the wall portion during the period of cooling to cure and thus forming a beam-shaped plate fixing member. The molten synthetic resin is poured into the space between the two shape regulating plates from an injection nozzle and the nozzle moves in the space at a speed nearly the same as the speed of the molten resin which flows down from the upper end of the envelope separator to the upper end of the plate.

The polyolefin resin made molten by heating preferably has a fluidity of at least 30 in terms of melt index value and preferably this resin is poured into the portion above the plate group and solidified in such state as embracing the upper part of the plates and thus, a beam-shaped plate fixing member can be surely formed.

The two regulating plates contact with the molten resin and hold the shape at the time of curing by cooling, and it is preferred to treat the surface of the regulating plates contacting with the resin with a material having both the releasing effect and heat resistance, for example, fluorocarbon polymers such as polytetrafluoroethylene in order to smoothly carry out removal of the plates after curing of the resin, namely, smoothly carry out so-called releasing.

By employing such construction, the upper parts of the positive and negative plates and the envelope separators of the plate group contained in each cell chamber are fixed as a whole by the beam-shaped plate fixing member made of a synthetic resin or the upper parts of the envelope separators are caught into or fusion bonded to the fixing member and thus, integrally fixed by the fixing member, and furthermore, at least one end of the left and right ends of the beam-like plate fixing member is fusion bonded to and integrated with the side wall of the case or the inner partition wall which forms the cell chamber. Accordingly, even if vibration is applied to the battery, the plate group is prevented from moving or deflecting in the cell chamber. Especially since one end of the beam-shaped plate fixing member is integrated with the side wall of the case or the inner partition wall, the ability to fix the position of the plate group is enhanced and the force of vibration is inhibited from being concentrated on the connecting strap which integrates the lugs of the plates of the same polarity and on the cell connector which is provided linking to the above-mentioned connecting strap and is connected, through the inner partition wall, to a connecting strap of the plates of different polarity of the plate group contained in the adjacent cell chamber. As a result, falling off of active material caused by positional deflection of plates, fatigue of metal due to the concentration of vibration, and cracking or breaking of the upper part of the plates, the connecting straps or the cell connectors caused by the fatigue of metal can be prevented.

Other characteristics and advantages of the present invention will be explained in detail in the following examples.

EXAMPLE 1

Figure 1:
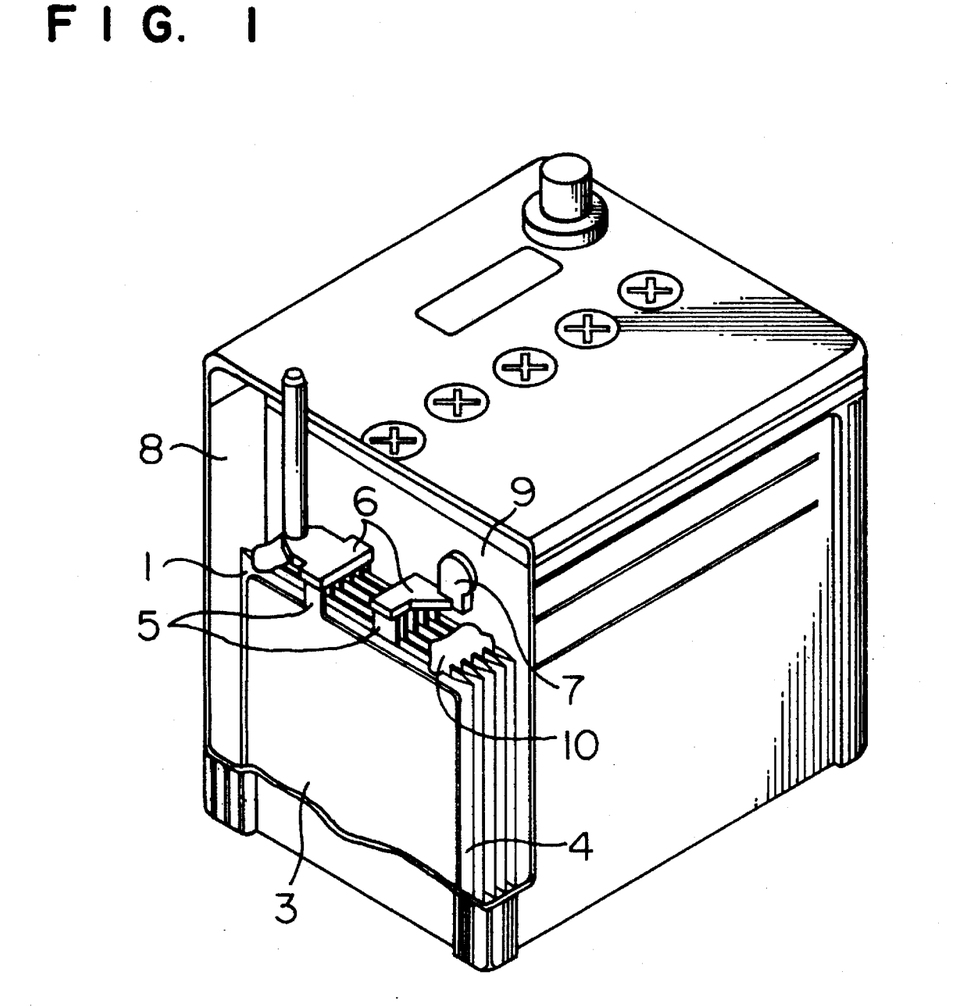
FIG. 1 is a sectional oblique view of the lead acid storage battery made in Example 1 of the present invention.

FIG. 1 illustrates the lead acid storage battery in Example 1 of the present invention and especially shows the state of fixing of plate group in the cell chamber in the case.

This lead acid storage battery has an output voltage of 12 V and a capacity of 30 Ah and the size of the container comprising the case and the cover is 200 mm in height, 233 mm in length and 120 mm in width. Length (in depth direction) of each of the six cell chambers formed in the lengthwise direction (in the lining direction of the cell chamber) of the case is 37 mm. Plate group 1 of about 114 mm in height, about 100 mm in width and 37 mm in total thickness is put in pressurized state in each cell chamber.

The plate group 1 comprises, for example, five positive plates 2, six negative plates 3 and envelope separators 4 between adjacent positive plate and negative plate which envelope each of the positive plate 2, these positive plates, negative plates and envelope separators being alternately arranged. The envelope separators 4 are prepared by cutting a microporous polyolefin resin sheet, for example, a microporous polyethylene sheet to a given size, folding the sheet in two in the form of U and integrally fixing both the left and right ends of the folded sheet. The upper end of the folded sheet extends to a position higher than the upper end of the positive plate enveloped in the folded sheet.

Lugs 5 of the positive and negative plates are provided so that those of the same polarity are situated in a straight line and near the central part above the plate group and they are electrically and mechanically integrated by the connecting straps 6 for positive plates and negative plates. Cell connector 7 is provided integrally at one end of the connecting strap 6 by welding. This cell connector 7 is welded to a connecting strap for the plates of different polarity in the adjacent cell chamber through inner partition wall 9 provided for forming cell chambers in the case 8.

Thus, the six cells are all electrically connected in series to maintain an output voltage of 12 V. FIG. 1 shows a cutaway view of the leftmost first cell chamber of the six cell chambers. Therefore, a connecting pole which connects to a terminal for all the negative plates in the battery is provided at the connecting strap for negative plates in this cell in place of a cell connector. For the same reason, although not shown, a connecting pole which connects to a terminal for all the positive plates in the battery is provided at the connecting strap for positive plates contained in the last sixth cell chamber.

Furthermore, as shown in FIG. 1, since the lugs of the positive and negative plates and the connecting straps which connect and integrate the lugs are provided near the central part above the plate group, the left and right end sides above the plate group have spaces greater than those in conventional general batteries.

A polyolefin resin, polyethylene here, kept in molten state by heating to about 200° C. and having a fluidity of at least 30 in terms of melt index value was poured in the form of a streak into the portions near the left and right end above the plate group by an injection nozzle to form beam-shaped plate fixing member 10.

The melt index here is an index which shows the fluidity of thermoplastic resins such as a polyolefin resin at plasticized state. This is also called melt flow index or melt flow rate and is a widely used index which is specified in flow test method for thermoplastics of JIS K7210.

Since the polyethylene which forms the beam-shaped plate fixing member 10 has a high fluidity of 30 or more in melt index value in a heated and molten state, not only does it reach the envelope separators 4 higher in height than the plates, but also it enters between the envelope separators to reach the upper portions of the positive plates 2 and negative plates 3, and it catches the upper end of the envelope separators 4 thereinto to give heat to the envelope separators resulting in partial fusion of the envelope separators. As a result, the polyethylene is cooled in such a state fix the upper parts of the plates.

Therefore, the positive plates, negative plates and envelope separators are fixed and integrated at two portions, namely, by the two beam-shaped plate fixing members in addition to the connecting strap 6 upon solidification or curing of the polyethylene by cooling.

Thus, since the plate group is fixed and integrated by the two connecting straps 6 and the two beam-shaped plate fixing members, namely, at four portions in total and in addition, since the plate group per se is put in pressurized state in the cell chamber, deflection in position or movement between the plates and between the plate and the envelope separator caused by vibration can be sufficiently prevented.

Furthermore, since polypropylene is used as a material of the case and polyethylene which is a polyolefin resin is used as a material of the plate fixing member 10, even when the heated and molten polyethylene is poured after inserting the plate group in the molded and sufficiently hardened case, a part of the heat possessed by the molten polyethylene per se is given to the inner wall of the case or the surface of the inner partition wall which contacts with the polyethylene to soften the portion of the inner wall or the surface of the inner partition wall resulting in fusion bonding between the inner wall of the case or the inner partition wall and the plate fixing member. Accordingly, the plate group is also integrated with the case through the beam-shaped plate fixing member and hence, breakage of the connecting straps or the connectors due to concentration of vibration or stress thereon does not occur and a construction having markedly high vibration resistance is provided.

Figure 2:
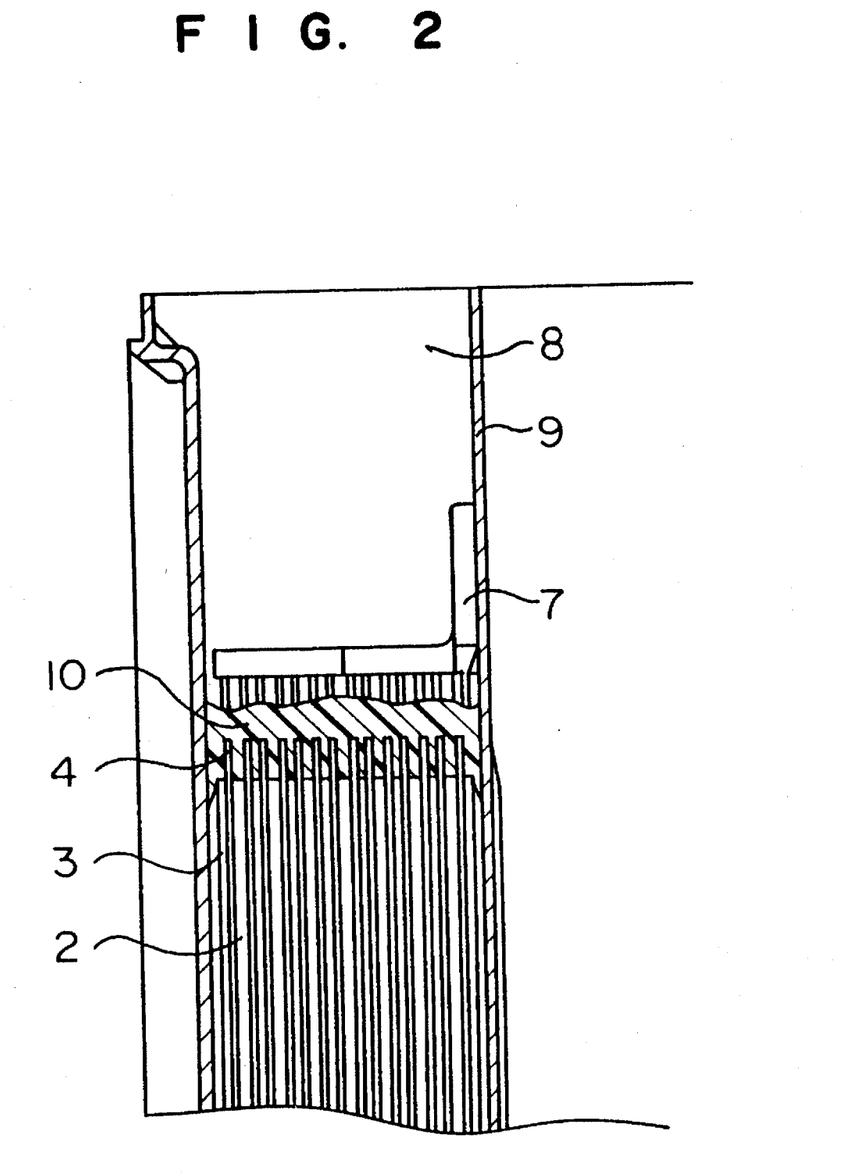
FIG. 2 shows the state of bonding between the plate group and the plate fixing member in the lead acid storage battery made in Example 1.

FIG. 2 is a partial sectional view which shows the bonding state between the plate fixing member 10 and the plate group 1 and between the member 10 and the leftmost inner wall of case 8 or the inner partition wall 9.

Figure 3:
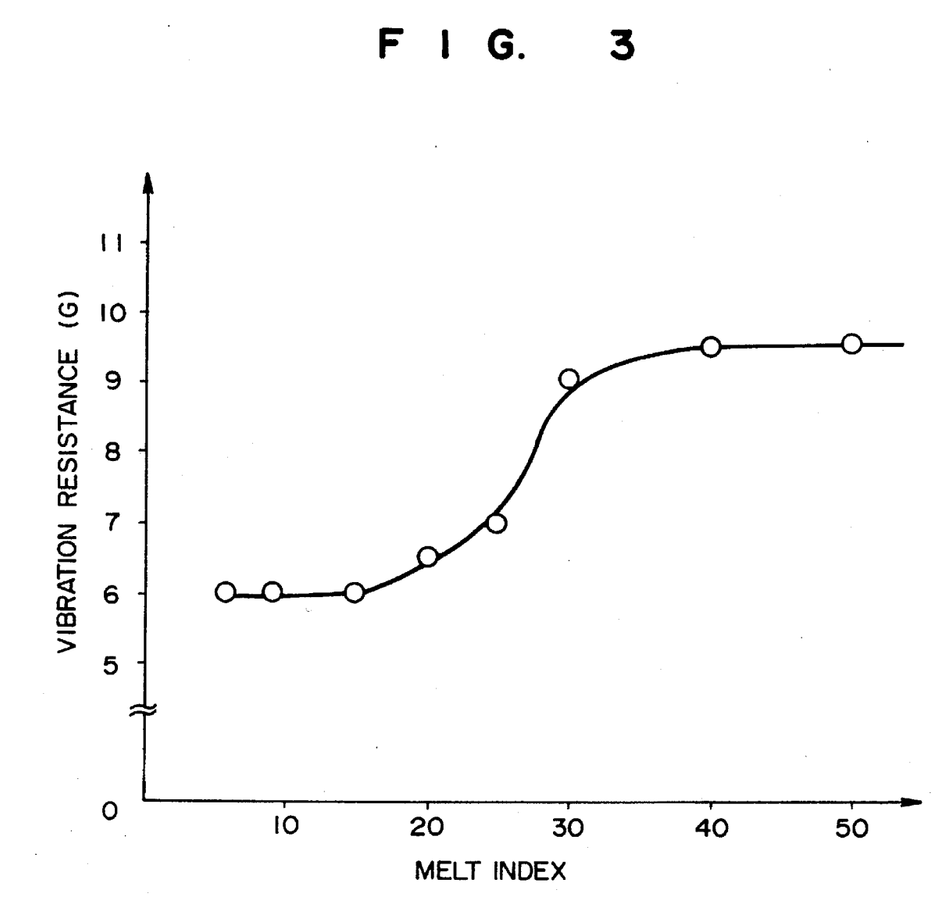
FIG. 3 is a graph which shows the relation between melt index value of the resin which forms the plate fixing member and vibration resistance of the battery.

FIG. 3 is a graph which shows the relation between melt index value of the plate fixing member 10 and vibration resistance of a battery provided with this plate fixing member 10. When the melt index value of the plate fixing member 10 is 30 or more, the battery generally shows a high vibration resistance.

On the other hand, the case is made of a polypropylene having a melt index value of 9 and a melting point of about 160° C., and the molten polyethylene poured keeps a temperature of about 200° C. and a melt index value of 30 or more, and these are both polyolefin resins. Therefore, they fusion bond to each other and the bonding strength is high. The plate fixing member 10 here may be any of polymer resins mainly composed of olefins in addition to polyethylene and they show relatively high fusion bonding strength.

When the case is made of normally used crystalline polypropylene and the beam-shaped plate fixing member 10 is also made of polypropylene, the polypropylene of the plate fixing member 10 is preferably amorphous. The amorphous polypropylene in a heated and molten state gives heat to a part of the crystalline polypropylene which forms the case to melt the part and satisfactorily adapt thereto to provide a high fusion bonding strength.

Therefore, as the materials of the plate fixing member 10, there may be used not only polyethylene and polypropylene, but also any other polyolefin resins as far as they can be fusion bonded.

Since the above-mentioned polypropylene case has an melt index value of 9, moldability and shock resistance required for cases are sufficiently maintained.

In pouring the heated and molten polyethylene or polypropylene into the cell chamber in the case, when a nozzle is positioned opposing nearly the center of the thickness of the plate group in the vicinity of left and right portions above the plate group, the poured molten resin just under the nozzle is most strongly pushed by the pouring pressure (gravity of the resin per se) and then begins to flow in both the left and right directions or along the envelope separators in the form of a streak. This results in covering a wide area of the upper surface of the plate group. However, it is preferred to restrict the area of the upper surface of the plate group to be covered with the resin to at most 80% in order to smoothly carry out pouring of electrolyte in fabrication of lead acid storage battery and discharging of gas generated with charging of the battery into the gas phase portion in the upper part of the cell chamber. The minimum covering area must be about 2% though it depends on the height of the beam-shaped plate fixing member 10 formed upon curing of the poured resin by cooling.

Figure 4:
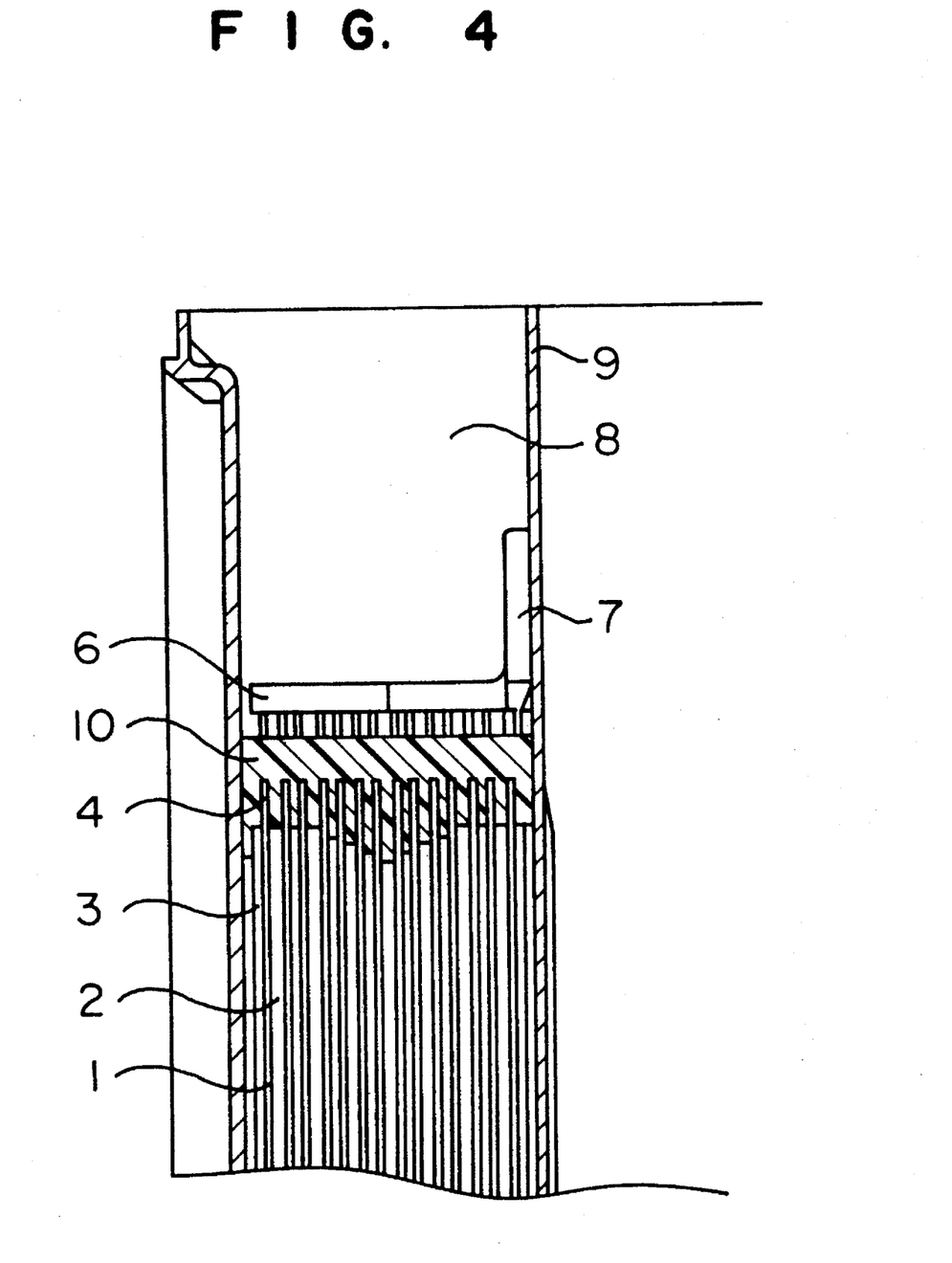
FIG. 4 is a sectional view of another embodiment of the plate fixing member.

Irrespective of the beam-shaped fixing member being maximum one or minimum one, as shown , in FIG. 4 of longitudinal section along the lengthwise direction of the beam-shaped plate fixing member 10, the portion of the formed member just under the nozzle is thicker than other portions. As a result, the strength to fix the plate group at the thicker central portion is higher than the portions in the vicinity of the left and right ends.

EXAMPLE 2

The beam-shaped plate fixing member can be provided in the form having a section longer in lengthwise direction, namely, a rectangular section, using shape regulating plates as a pouring frame for the molten resin. An example thereof is shown in FIG. 5.

Figure 5:
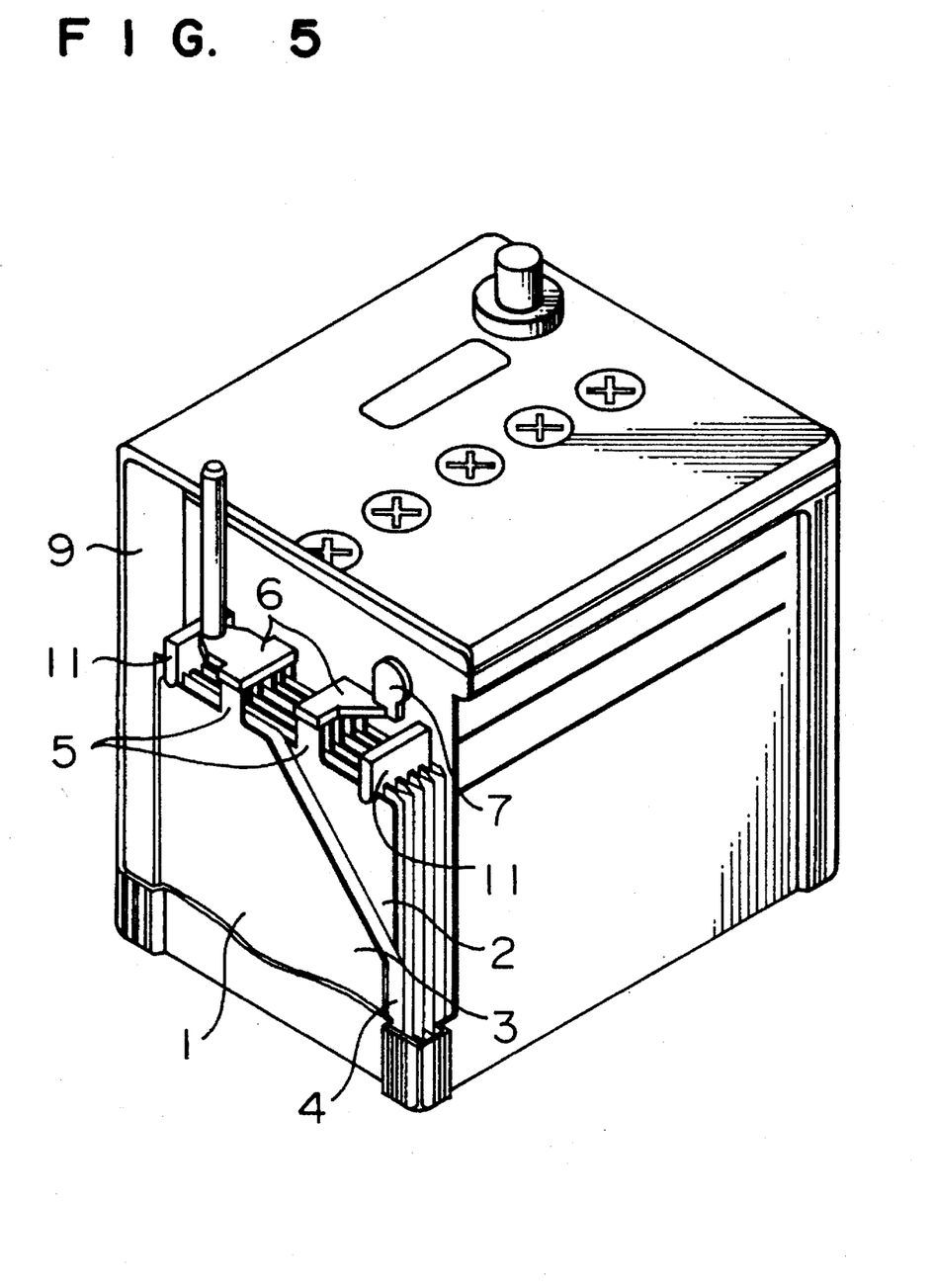
FIG. 5 is a sectional oblique view of the lead acid storage battery made in Example 2 of the present invention.

In FIG. 5, 11 indicates a beam-shaped plate fixing member made of polyethylene and having a rectangular section and having a size of 37 mm in length which is the same as the width of the cell chamber, 13 mm in thickness and about 20 mm in height. Both the left and right ends in the lengthwise direction fusion bond to the inner side wall of the cell and the inner partition wall.

By increasing the height of the beam-shaped plate fixing member 11 having a rectangular section, the strength of fixing and integrating the upper part of the plate group and the strength of fusion bonding to and integrating with the side wall of cell chamber and the inner partition wall increase and as a result, the strength of fixing the plate group in the cell chamber can be increased and vibration resistance can be improved.

The method of forming the beam-shaped plate fixing member having a rectangular section will be explained referring to FIG. 6.

Figure 6:
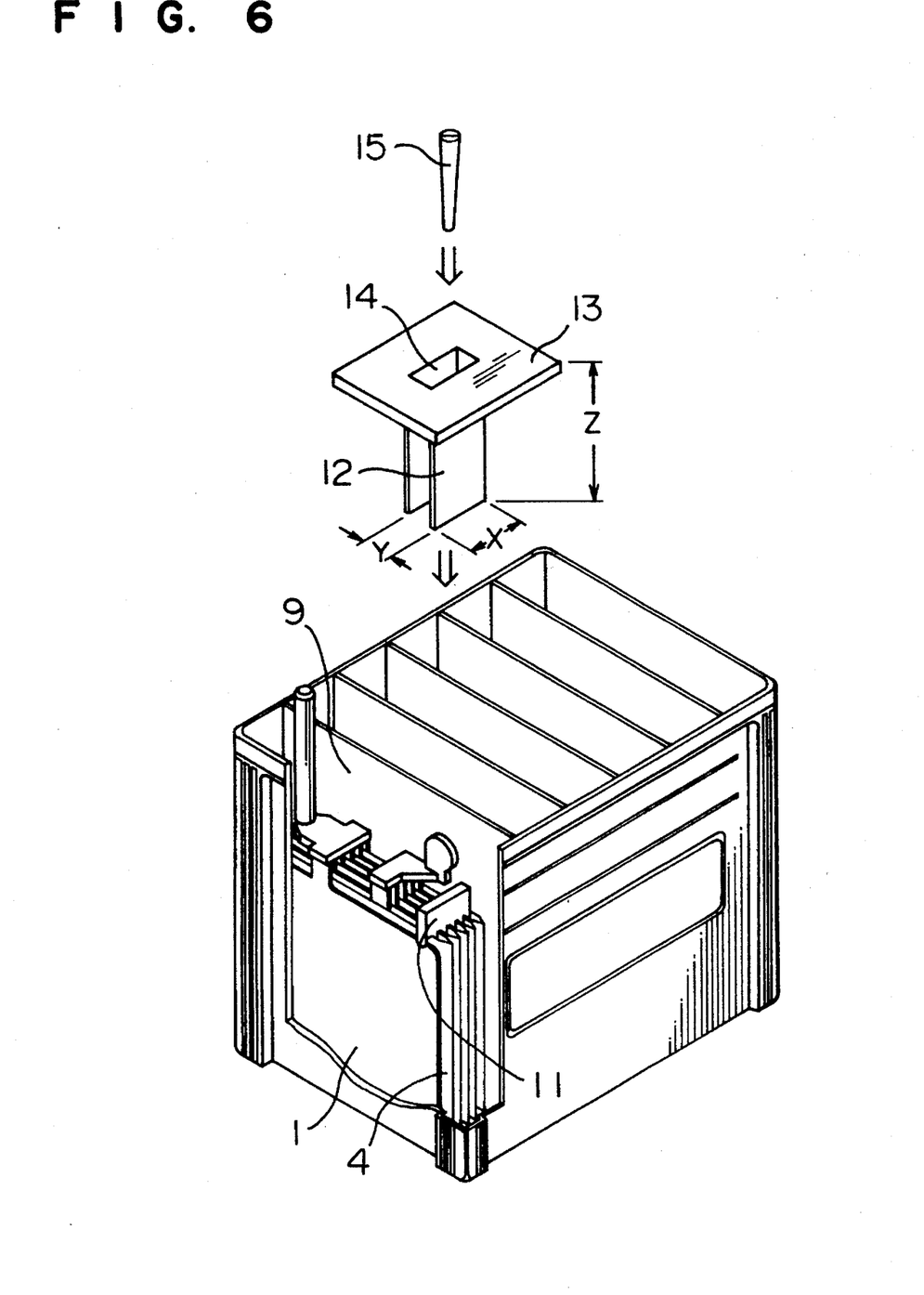
FIG. 6 explains the shape of the plate fixing member made in Example 2.

In FIG. 6, 12 indicates shape regulating plates. A pair of these plates which are opposed to each other are fitted to base 13 to form a shape fixing jig. In this case, width X of the shape regulating plate (guide plate) 12 is the same as or somewhat narrower than the interval between the inner partition walls 9, namely, the length in depth direction of the cell chamber, the distance Y between the opposing two guide plates is the thickness of the fixing member to be formed, and the height Z is the distance from the upper end of the case to the upper end of the envelope separator 4, namely, to nearly the upper surface of the plate group. The numeral 14 is a hole for inserting a nozzle provided at the base 13 and 15 indicates a nozzle for pouring a molten resin, for example, polyethylene.

The jig shown in FIG. 6 is for forming one plate fixing member and comprises base 13 to which a pair of shape regulating plates 12 are fixed. Such jig is employed because poles as output and input terminals are provided at the first cell and the last sixth cell in the case and hence, it is convenient to form the plate fixing members separately. However, for the second to fifth cells which have no pole, two pairs of opposing shape regulating plates are provided at a base having a length corresponding to the length (in depth direction) of the cell chamber and two pairs of the guide plates can be arranged being opposed to the portions near the left and right end above the plate group, respectively, and a molten resin can be poured from a nozzle inserted through the hole for inserting the nozzle to form the plate fixing members.

Figure 7:
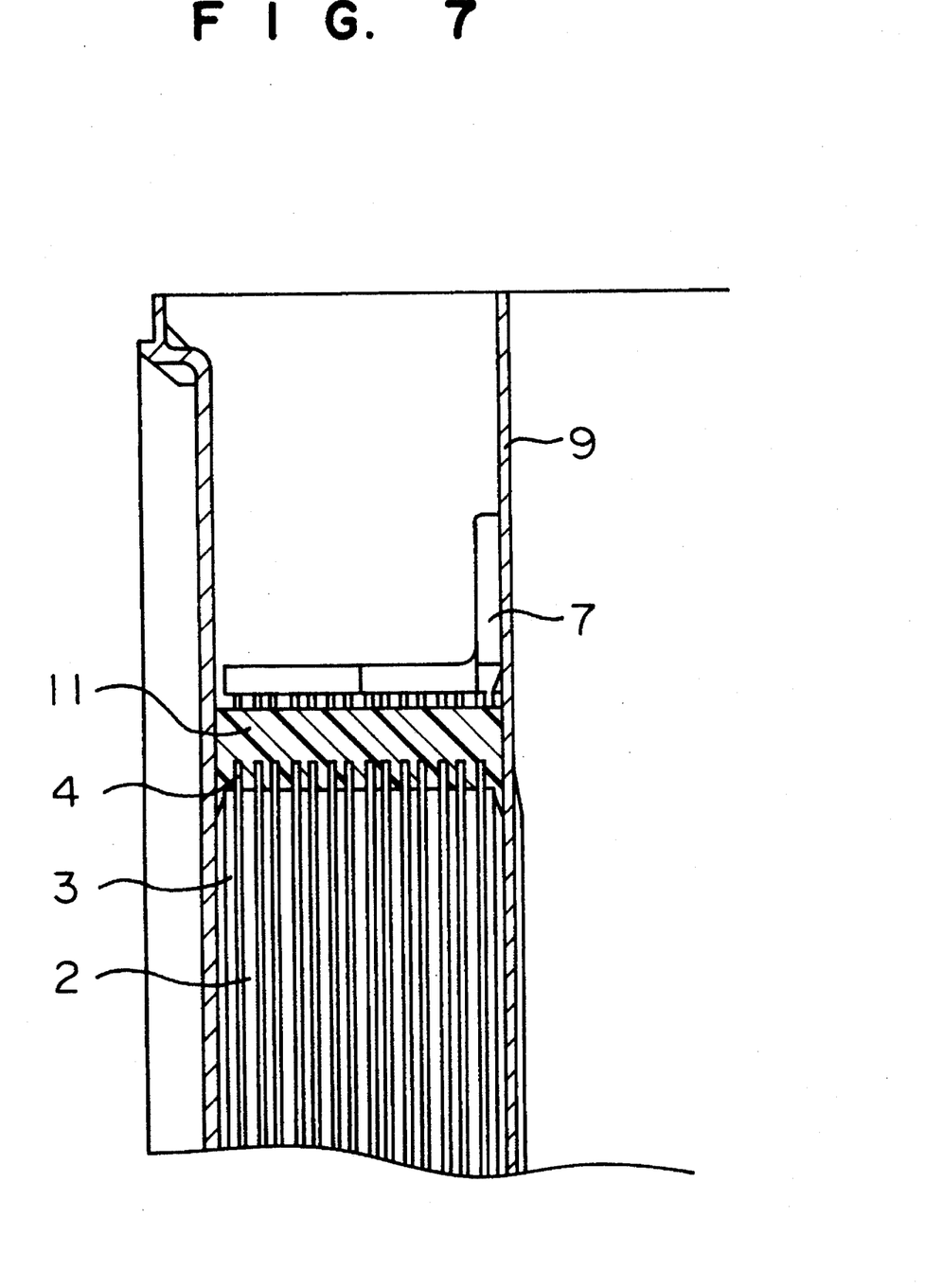
FIG. 7 is a sectional view of the plate fixing member formed in Example 2.

The specific method for forming the plate fixing member is as follows. The shape fixing jig is fitted to the desired cell in the case and nozzle 15 is inserted from the nozzle inserting hole 14 of the shape fixing jig and a resin of relatively high viscosity (MFR=50 g/10 min) in the molten state, for example, polyethylene, is discharged therefrom. The polyethylene in the molten state discharged from the nozzle flows down in the vertical direction of the plate by its own fluidity and flows between the envelope separators extending to the position higher than the plate and simultaneously spreads in the planar direction crossing the upper surface of the plate group to contact with the inner partition wall and furthermore, it tries to spread in the direction of arrangement of the plates, but the planar spread of the polyethylene in the direction of arrangement of the plates is hindered by the two shape regulating plates 12 and the polyethylene stays in the rectangular space formed by a pair of the opposing two shape regulating plates 12 and the inner partition wall 9. Thereafter, the molten resin flows by gravity in the direction of the upright plates (the resin can flow only in this direction) and reaches the upper frame of the positive and negative plates which is positioned lower than the upper end of the envelope separators. When the molten resin is cured in this state, as shown in FIG. 7, the upper frame of the positive and negative plates and envelope separators 4 are fixed to form an integral plate group and furthermore, the beam-shaped insulating plate fixing member 11, the both ends of which are fixed to the inner wall of the case or the inner partition wall 9, is formed.

In this construction, the interval Y between the opposing shape regulating plates 12 is preferably set at 2–80% of the width of the plate as aforementioned. If the interval Y is less than 2% of the width of the plate, the thickness of the beam-shaped plate fixing member 11 formed is too thin and the strength is insufficient and sufficient fixing effect cannot be obtained. If the interval Y is more than 80% of the width of the plate, the resulting beam-shaped plate fixing member considerably hinders the diffusion of the poured electrolyte to cause decrease of capacity of the battery. For satisfying the fixing strength of plates and plate group and pouring operation of electrolyte, the proportion of the width of the plate fixing member 11 in the width of the plate is preferably about 10–30%.

Furthermore, by subjecting the inner surface of the opposing shape regulating plates with which the molten resin contacts to surface treatment such as fluorine treatment for the purpose of providing releasing effect, the shape regulating jig can be easily removed when curing of the molten resin is completed or the surface of the molten resin reaches curing state and as a result, workability for forming the plate fixing members can be improved.

Usually, when a battery receives a vibration, each of the plates is going to vibrate or vibrates around a pivot which is the lug 5 fixed by the strap and as for the plate group, this is going to vibrate or vibrates around a pivot which is the connecting strap or the cell connector. However, according to the construction as formed by the method of the present invention, vibration of the plates and the plate group in the cell chamber can be sufficiently inhibited by the effect of fixing the plates and the plate group by the two beam-shaped plate fixing members.

As explained above, according to the present invention, a plate group comprises a plurality of positive plates alternating with a plurality of negative plates and envelope separators between adjacent plates, said envelope separators extending to a position higher than the plates, the lugs of the plates of the same polarity being connected by a strap and a connector, is put in each of the cell chambers formed in the case, and an insulating resin in the molten state is poured into the portions above the plate group in such a manner that both ends of the resin contact with the inner wall of the case or the inner partition wall, thereby to form a beam-shaped plate fixing member. This plate fixing member fixes the upper portions of all plates and envelope separators to inhibit positional deflection of the plates and vibration of the plate group in the cell chamber when vibration is applied to the battery. Thus, lead acid storage batteries of high reliability are provided.

What is claimed is:

1. A lead acid storage battery, comprising:

a monoblock case made of a thermoplastic synthetic resin and comprising a plurality of cell chambers formed by partitioning the case with a plurality of inner partition walls;

a plate group contained within each of the cell chambers, the plate group having lower and upper ends and comprising a plurality of positive plates, negative plates, and microporous envelope separators made of a polyolefin, the positive plates and the negative plates being alternately arranged and the envelope separators enveloping each of the positive plates or each of the negative plates, and each of the plates having lower and upper ends and being provided with a lug at nearly the center of the upper end of the plate and the respective plates of the same polarity being connected at the lugs by a connecting strap;

at least one beam-shaped plate fixing member having a central portion and opposing ends, the plate fixing member being made of a polyolefin and being integrally fixed to at least one area on the upper end of the plate group by thermal fusion bonding to the envelope separators, and at least one end of the plate fixing member being integrally fixed to the cell chamber by thermal fusion bonding to the inner wall of the case or one of the inner partition walls; and a cover which covers the case and is made of a thermoplastic synthetic resin.

2. The lead acid storage battery of claim 1, wherein both ends of the plate fixing member are integrally fixed to the cell chamber.

3. The lead acid storage battery of claim 1, wherein the envelope separators are made of polyethylene.

4. The lead acid storage battery of claim 3, wherein the case is made of polypropylene and the plate fixing member is made of polyethylene.

5. The lead acid storage battery of claim 3, wherein both the case and the plate fixing member are made of polypropylene.

6. The lead acid storage battery of claim 3, wherein the case is made of a crystalline polyethylene, and the plate fixing member is made of a non-crystalline polyethylene.

7. The lead acid storage battery of claim 2, wherein the plate fixing member crosses above the plate group in the direction of the thickness of the plate group, and the thickness of the central portion of the plate fixing member is greater than the thickness of the ends.

8. The lead acid storage battery of claim 1, wherein the polyolefin forming the beam-shaped plate fixing member has a fluidity of at least 30 in melt index value when molten.

9. The lead acid storage battery of claim 1, further comprising a second plate fixing member which is integrally fixed by thermal fusion bonding to the plate group and the cell chamber.

* * * * *